Figure 1:
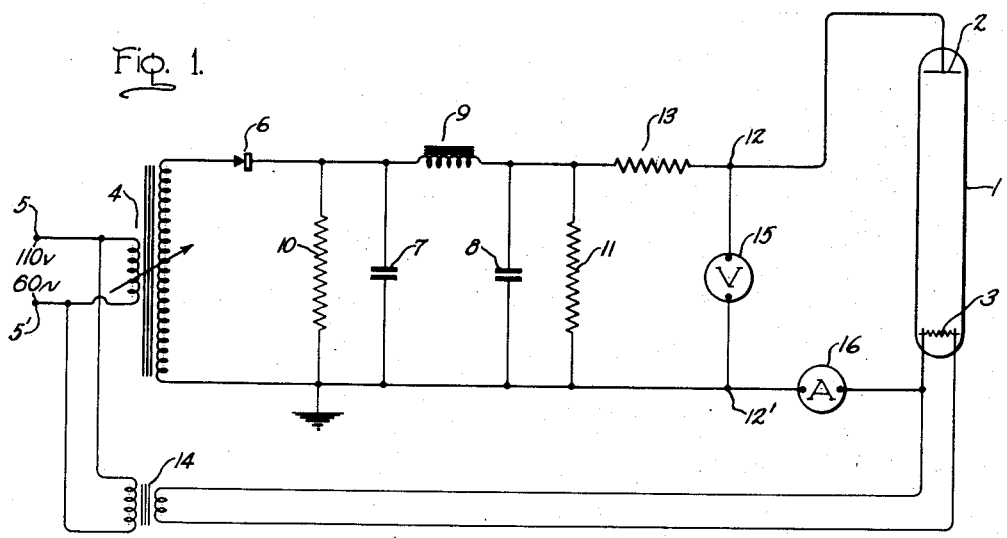

Sept. 29, 1953    C. KENTY    2,654,051
METHOD OF MEASURING MOLECULAR IMPURITIES IN RARE GASES
Filed Jan. 20, 1950    2 Sheets-Sheet 1

Inventor:
Carl Kenty,
by Vernet C. Kauffman
His Attorney.

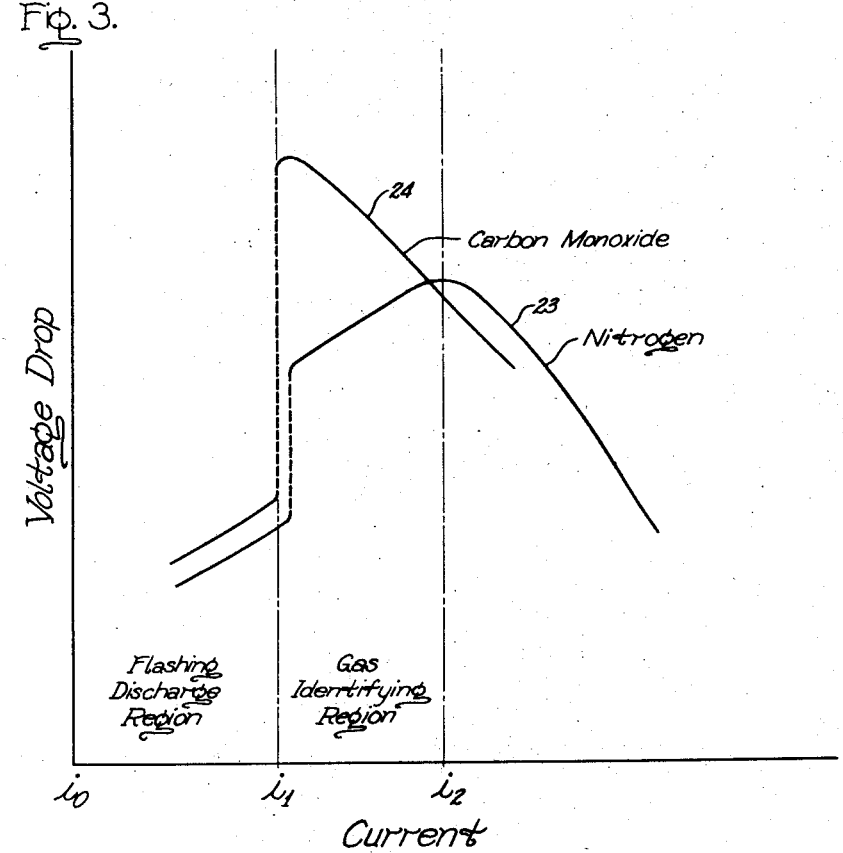

Patented Sept. 29, 1953

2,654,051

UNITED STATES PATENT OFFICE 2,654,051

METHOD OF MEASURING MOLECULAR IMPURITIES IN RARE GASES

Carl Kenty, Cleveland Heights, Ohio, assignor to General Electric Company, a corporation of New York Application January 20, 1950, Serial No. 139,774

7 Claims. (Cl. 324—24)

This invention relates generally to phenomena connected with the discharge of electricity through rare gases, and more particularly to modifications produced in the characteristics of such discharges by the presence of small quantities of gaseous molecular impurities.

It is an object of my invention to provide a new and improved method of detecting and measuring molecular impurities in rare gases.

Another object of my invention is to provide an improved method of measuring minute quantities of molecular impurities in gaseous discharge lamps which does not cause the destruction of the lamp or any modification of its operating characteristics as a result of the testing and measuring procedure.

My improved method is based on the extreme sensitivity of a low current positive column discharge to minute traces of a molecular gas in a mixture of a rare gas, at a pressure of a few millimeters, with a small quantity of mercury. The measurement of the voltage drop due to the discharge across electrodes placed in a glass tube containing the gaseous mixture to be analyzed, permits a quick and reliable determination of the concentration of the impurity. In addition, certain other characteristics of the discharge, such as either a positive or a negative current characteristic, permit, in practice, differentiation between certain different kinds of molecular impurities which are commonly encountered in commercial supplies of the inert gases.

For further objects and advantages and for a better understanding of my invention, attention is now directed to the following description and accompanying drawings. The scope of my invention will be more fully pointed out in the accompanying claims.

In the drawings:

Fig. 1 is a schematic diagram of apparatus utilized in carrying out the method of my invention.

Figure 2:
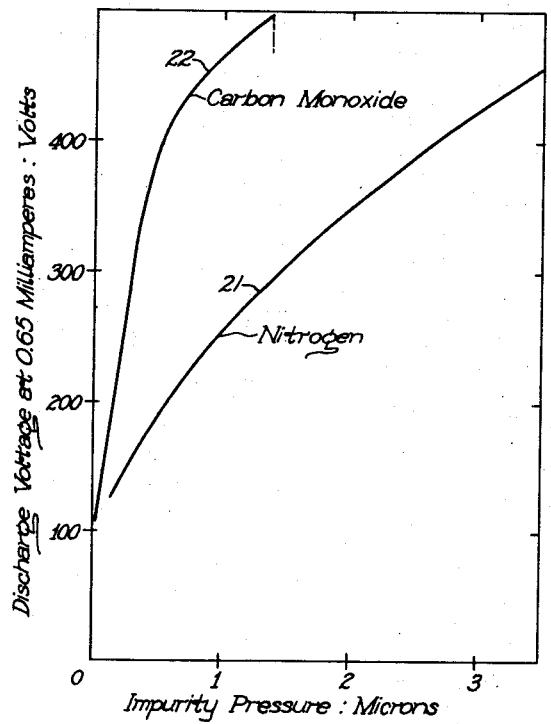

Fig. 2 contains a pair of curves illustrating graphically the voltage drop due to a constant discharge current through an inert gas containing mercury and varying pressures of a molecular impurity, the curves illustrating the specific characteristics due to carbon monoxide and nitrogen as the molecular impurities.

Fig. 3 illustrates graphically certain characteristics of the discharges which are utilized in differentiating between nitrogen and carbon monoxide.

In carrying out my method, I prefer to employ an elongated glass tube of substantially greater length than diameter such as is illustrated by 1 in Fig. 1. In practice, such a tube may be identical to those commonly utilized in the commercially available 40 watt fluorescent lamps, these tubes being 4 feet long and 1½ inches in diameter. The tube may be either clear or coated with a phosphor. However the method is not limited to any particular size, nor to any particular type of tube or envelope.

Referring again to Fig. 1, the tube is provided with an anode 2 and a thermionic electrode 3 which may be a coil of tungsten wire coated with suitable activating materials such as barium and strontium oxides. The tube contains the inert gas wherein the concentration of a molecular impurity is to be determined, and also a small quantity of mercury which fills the tube with its vapor pressure at the temperature of operation, this normally being room temperature.

The only additional equipment necessary for carrying out my method of determination of the molecular impurity is an adjustable source of current adapted to be connected across the electrodes, and means for measuring the voltage drop due to the discharge and the magnitude of the discharge current. For this purpose, I have illustrated an adjustable transformer 4 having a primary winding provided with input terminals 5, 5' adapted to be connected to the usual 110-volt, 60-cycle supply. The secondary voltage of transformer 4 is supplied to a rectifier 6 connected to a suitable filter comprising a pair of shunt capacitances 7 and 8 and a series inductance 9. A pair of bleeder resistances 10 and 11 are connected in parallel with capacitances 7 and 8, respectively, in order to stabilize the unidirectional output voltage at terminals 12, 12'. A current limiting resistance 13 is serially inserted between inductance 9 and output terminal 12. A small auxiliary transformer 14 is provided for the purpose of supplying heating current to thermionic electrode 3. In operation, the output terminals 12, 12' are connected across the electrodes of device 1, and voltmeter 15 and ammeter 16 provide a measure of the voltage drop across the device and the discharge current therethrough. This equipment has been described by way of illustration only, and it will be obvious to those skilled in the art that other forms of apparatus may be utilized for carrying out the method of my invention.

In carrying out my method, I transmit through tube 1 a low current and measure the increase in the voltage drop of the discharge due to the presence of the molecular impurity. The molecular impurity has an effect on the voltage drop at all current densities, and generally causes it to increase by destroying the upper metastable state of mercury. However, normal collisions between electrons and metastable atoms also destroy the upper metastable state of mercury and this effect increases with current density, whereas the effect of the molecular impurity changes little. As a result, the effect of the impurity is by comparison most noticeable at low current densities wherein it is predominant in destroying or neutralizing metastable atoms. Such atoms assist the discharge, and their destruction naturally causes an increase in the discharge voltage. I have found that current densities lying between 6.5 and 650 microamperes per square centimeter section of the discharge may be utilized in determining the concentration of the impurity. I prefer to employ a current density of approximately 65 microamperes per square centimeter. For the 1½ inch diameter tube which has been described, this entails a total current of 650 microamperes, or 0.65 milliampere.

In practice, any one particular device, or a sample device, such as a lamp, representative of a class, is calibrated with an inert gas containing known mixtures of a molecular impurity. Thereafter, all that is required is a comparison of the voltage drop obtained with the unknown mixture against the calibration curve of the device. Thus, referring to Fig. 2, curves 21 and 22 illustrate calibration curves obtained with nitrogen and carbon monoxide as impurities in argon, for a current of 0.65 milliampere in device 1 as described heretofore, at room temperature. The particular current of 0.65 milliampere provides a convenient standard because, over a considerable range of pressures of molecular impurities, the volt-ampere characteristic is relatively flat, that is, the voltage varies only slightly with the current so that only a rough adjustment of the latter is necessary. For this reason, it has been found convenient in manufacturing operations to specify the state of purity of the gas in a fluorescent lamp in terms of $V_{0.65}$, this being the voltage drop produced in a definite type of lamp with a current of 0.65 milliampere. Naturally, separate calibrations have to be made for the different types of lamps with their different lengths, diameters, and average gas fillings.

Referring to Fig. 2, it will be observed that for a constant current of 0.65 milliampere when the pressure due to the molecular impurity is very small, the voltage is low. The discharge under these conditions has the ordinary running striations but as the pressure of the molecular impurity is increased, these running striations gradually disappear and the discharge becomes steady in the region between 300 and 450 volts. Beyond this region, a further increase in pressure of the impurity causes the discharge to change over into another form which I call a flashing discharge which is both strongly current modulated and transversely striated throughout its length. This form of discharge is not very suitable for use as a measure of the concentration of the molecular impurity because the voltage drop resulting therefrom is very sensitive to the pressure of the mercury inside the tube which is a function of temperature, and is also rather sensitive to current. For a more complete description of this type of flashing discharge, reference is made to my copending United States application No. 130,463, filed December 1, 1949, entitled "Flashing Discharge Device," and assigned to the same assignee as the present invention. Referring to curve 22, the dotted line dropping down from the highest point of the curve indicates the onset of the flashing discharge, at which occurrence the voltage drop across the tube suddenly falls to a value perhaps 40 per cent less than its original value. The current density at which the flashing discharge occurs depends largely on the ratio of the pressure of the impurity to the pressure of the vapor of mercury at the operating temperature of the lamp. Advantage may be taken of this relation to measure high concentrations of the impurity by raising the temperature of the lamp. For instance, by operating lamp 1 in an oven at 60° C., I have found that it is possible to measure pressures of nitrogen up to 20 microns in pressures of rare gasses between 0.1 and 10 millimeters.

I have found that the method can be used, not only to indicate the concentration of impurity present, but also to differentiate between different molecular impurities, that is, it can be used to some extent to determine the nature of the molecular impurity. Thus, if the impurity is such that $V_{0.65}$, that is, the voltage drop across the tube for a discharge current of 0.65 milliampere, lies between 300 and 450 volts, the lamp will have a positive resistance characteristic when the impurity is nitrogen, and a negative resistance characteristic when the impurity is carbon monoxide. This phenomenon is illustrated in Fig. 3 wherein curves 23 and 24 represent the volt-ampere characteristics of mixtures of a rare gas and mercury vapor containing nitrogen and carbon monoxide as impurities, respectively. Starting with very low currents, the voltage drop in the region from $i_0$ to $i_1$ is comparatively low and a flashing discharge occurs through the tube. In the region from $i_1$ to $i_2$, a sudden increase in the voltage drop occurs, the flashing ceases and the discharge becomes steady. Beyond this region, the voltage drop decreases and gradually attains values typical of the normal operation of low pressure mercury discharge or fluorescent lamps.

In the region from $i_1$ to $i_2$, which I call the gas identifying region, the volt-ampere characteristic for nitrogen slopes upwards, whereas that for carbon monoxide slopes downwards. Thus, in the current region immediately above the cessation of the flashing discharge, nitrogen provides a positive current characteristic, and carbon monoxide provides a negative current characteristic. The nature of the impurity, as between nitrogen and carbon monoxide may be determined by providing a slight positive increment to the discharge current which is normally held constant at 0.65 milliampere. If the resulting increment in voltage drop across the tube is positive, the gaseous impurity is nitrogen. If the voltage increment is negative, the impurity is carbon monoxide; and if the increment is substantially zero, the impurity is likely to be a mixture of nitrogen and carbon monoxide. Since the above-mentioned molecular gases are the two impurities most commonly found in discharge lamps, the method thus enables a distinction to be easily made between the two gases.

Similar calibration curves may be made for hydrogen or oxygen, but I have found that these gases clean up or disappear very quickly by the action of the electric discharge, due to combination with elements within the tube. Thus, such gases can be easily distinguished from nitrogen or carbon monoxide. On the other hand, the cleaning up of nitrogen or carbon monoxide at the low current value of 0.65 millimapere is very slow and permits a measurement to be made without any substantial change in the concentration of the impurity within the lamp. This is a considerable advantage since small quantities of gaseous impurities evolved or liberated in a lamp while stored over long periods of time can thus be studied. My method permits the ready determination of quantities of impurities as small as 1 part in 100,000. In general, such small quantities of impurities could not be studied by the methods of spectroscopy because large currents would have to be used to obtain the necessary intensity of light emission to study the spectral lines and any impurity would quickly clean up. Nor could such small quantities of impurities be determined by the so-called "starting voltage" method of testing which, in its essence, consists of determining the voltage required for initiating a normal arc discharge in the lamp. This method is relatively uncertain and is subject to statistical variations in batches of lamps. Moreover, it leaves the lamp in quite a different condition as to impurity content after the test from what it was before.

Another advantage of my method is the speed and facility with which it may be carried out. I have found that, in practice, a fluorescent lamp of the type mentioned can be tested for impurities in a few minutes, and the composition of the gas within it is left in no way changed by the test.

I have found that my method of measuring impurities works well with argon, kryton or xenon as the main gas within which the concentration of a molecular impurity is to be determined. It also works well with neon and helium, and is, in general, adaptable to measuring the concentration of molecular impurities in any of the rare gases.

Although I have illustrated the method as applied to a lamp, it will be obvious that the method may be used for sampling by providing suitable means for introducing small quantities of the gas into device 1. The method could then be utilized to provide a continuous record of the concentration of impurity in the commercial production of any of the rare gases.

My method also has the advantage that the voltage drop across the discharge is not very sensitive to the filling pressure of the main gas. In practice, I generally provide the main gas at the pressure of 3.5 millimeters of mercury which is the standard filling pressure of low pressure fluorescent lamps. However, the method can be used successfully over a range of filling pressure of the main gas between 0.1 to 10 millimeters of mercury.

While a specific apparatus has been described for carrying out my invention, it will be obvious that various modifications thereof may be utilized. Moreover, whereas I have provided specific curves illustrating the use of the method for certain particular gas combinations, it will be understood that my invention is not limited thereto and can likewise be used with other combinations of gases. The appended claims are, therefore, intended to cover any such modifications coming within the true spirit and scope of the invention.

What I claim as new and desire to secure by Letters Patent of the United States is:

1. The method of measuring the concentration of a gaseous molecular impurity in a mixture of an inert gas with said impurity, which comprises the steps of introducing a sample of said mixture at a low pressure into an evacuated envelope containing a pair of electrodes and a small quantity of mercury, transmitting a constant current, of predetermined value slightly in excess of that required to produce a flashing discharge, through said sample, and measuring the voltage drop between said electrodes to determine the concentration of said impurity.

2. The method of measuring the concentration of a gaseous molecular impurity in a mixture of an inert gas with said impurity, which comprises the steps of introducing a sample of said mixture at a low pressure into an evacuated envelope containing a pair of electrodes and a small quantity of mercury, transmitting a constant current, of predetermined value in excess of that required to produce a flashing discharge, but low enough to insure a high ratio of destruction of metastable mercury atoms by the impurity as against destruction by other causes, through said sample, and measuring the voltage drop between said electrodes to determine the concentration of said impurity.

3. The method of measuring the concentration of a gaseous molecular impurity exerting a partial pressure less than 20 microns in a mixture of an inert gas with said impurity exerting a total pressure in the range between 0.1 and 10 millimeters, which comprises the steps of introducing a sample of said mixture into an evacuated envelope containing a pair of electrodes and a small quantity of mercury, transmitting a constant current, of predetermined value slightly in excess of that required to produce a flashing discharge, through said sample, and measuring the voltage drop between said electrodes to determine the concentration of said impurity.

4. The method of measuring the concentration of a gaseous molecular impurity exerting a partial pressure less than 20 microns in a mixture of an inert gas with said impurity exerting a total pressure in the range between 0.1 and 10 millimeters, which comprises the steps of introducing a sample of said mixture into an evacuated envelope containing a pair of electrodes and a small quantity of mercury, transmitting a constant current, of predetermined value in excess of that required to produce a flashing discharge, but low enough to insure a high ratio of destruction of metastable mercury atoms by the impurity as against destruction by other causes, through said sample, and measuring the voltage drop between said electrodes to determine the concentration of said impurity.

5. The method of measuring the concentration of an impurity of the class consisting of nitrogen and carbon monoxide and exerting a partial pressure less than 20 microns in a mixture of an inert gas with said impurity exerting a total pressure in the range from 0.1 to 10 millimeters, which comprises the steps of introducing a sample of said mixture into an evacuated envelope containing a pair of electrodes and a small quantity of mercury, transmitting a constant current of predetermined value, slightly in excess of that required to produce a flashing discharge, through said sample, and measuring the voltage drop between said electrodes to determine the concentration of said impurity.

6. The method of distinguishing between nitrogen and carbon monoxide as an impurity in a mixture with an inert gas which comprises the steps of introducing a sample of said mixture into an evacuated envelope containing a pair of electrodes and a small quantity of mercury, transmitting a current of predetermined value, slightly in excess of that required to produce a flashing discharge, through said sample, providing an increment to said current, and measuring the resulting increment in voltage drop across said electrodes to determine the resistance characteristic of said discharge as positive or negative, the former indicating nitrogen, and the latter, carbon monoxide as the impurity.

7. The method of measuring concentrations of less than 20 microns of gaseous impurities of the class consisting of nitrogen and carbon monoxide in low pressure fluorescent lamps provided with a pair of electrodes, an inert gas at a pressure between 0.1 and 10 millimeters of mercury and a small quantity of mercury, which comprises the steps of transmitting a constant current of predetermined value slightly in excess of that required to produce a flashing discharge, through said lamp, and measuring the voltage drop between said electrodes to determine the concentration of said impurity.

CARL KENTY.

References Cited in the file of this patent

UNITED STATES PATENTS

| Number | Name | Date |
|---|---|---|
| 1,649,016 | Buckley | Nov. 15, 1927 |
| 1,697,339 | Baker | Jan. 1, 1929 |
| 1,718,557 | Hickok | June 25, 1929 |
| 2,243,755 | James | May 27, 1941 |
| 2,245,168 | Suits | June 10, 1941 |
| 2,375,280 | Calbick | May 8, 1945 |

OTHER REFERENCES

Chapter VIII, "Glow Discharges," Gaseous Conductors, by J. D. Cobine, 1941, McGraw-Hill Book Co., N. Y. (Copy in Div. 54.)

"Conduction of Electricity Through Gases," by J. J. Thomson and G. P. Thomson, publication of University Press, Cambridge, England, 1928. (Copy in Div. 54.)